United States Patent [19]
Cruickshank

[11] Patent Number: 5,988,691
[45] Date of Patent: Nov. 23, 1999

[54] FLUID PIPELINES

[75] Inventor: John Duncan Cruickshank, Banchory, United Kingdom

[73] Assignee: Coflexip Stena Offshore limited, United Kingdom

[21] Appl. No.: 08/696,886

[22] PCT Filed: Feb. 17, 1995

[86] PCT No.: PCT/GB95/00344

§ 371 Date: Nov. 12, 1996

§ 102(e) Date: Nov. 12, 1996

[87] PCT Pub. No.: WO95/22713

PCT Pub. Date: Aug. 24, 1995

[30] Foreign Application Priority Data

Feb. 19, 1994 [GB] United Kingdom .................. 9403228
Oct. 21, 1994 [GB] United Kingdom .................. 9421404
Nov. 2, 1994 [GB] United Kingdom .................. 9422086

[51] Int. Cl.$^6$ ................. F16L 59/16; F16L 9/14
[52] U.S. Cl. ................ 285/55; 285/288.1; 285/370
[58] Field of Search ................ 285/55, 288.1, 285/370, 222.1; 29/890.14; 138/109, 147

[56] References Cited

U.S. PATENT DOCUMENTS

| | | | |
|---|---|---|---|
| 3,479,059 | 11/1969 | Taylor et al. | 285/55 |
| 3,700,268 | 10/1972 | Nielsen, Jr. | 285/55 |
| 4,366,971 | 1/1983 | Lula | 285/55 |
| 4,400,019 | 8/1983 | Fruck | 285/55 |
| 4,509,776 | 4/1985 | Yoshida | 285/55 |
| 4,556,240 | 12/1985 | Yoshida | 285/55 |
| 4,611,833 | 9/1986 | Lescaut | 285/55 |
| 4,691,740 | 9/1987 | Svetlik et al. | 285/55 |
| 4,883,292 | 11/1989 | Kuroki | 285/55 |
| 5,069,485 | 12/1991 | Allen et al. | 285/55 |
| 5,163,715 | 11/1992 | Rickard et al. | 285/55 |
| 5,320,388 | 6/1994 | Lacy et al. | 285/55 |
| 5,348,211 | 9/1994 | White et al. | 285/55 |
| 5,405,171 | 4/1995 | Allen et al. | 285/55 |
| 5,813,437 | 9/1998 | Esser | 285/55 |

Primary Examiner—Eric K. Nicholson
Attorney, Agent, or Firm—Osrolenk, Faber, Gerb & Soffen, LLP

[57] ABSTRACT

Means for securing a polymer liner to the inner surface of a pipe comprises an end piece consisting of a hub portion and a corrosion resistant metallic insert. The polymer hub is fusion welded to the end of the liner, and the metallic insert is seal welded portion of the inner surface of the pipe clad with corrosion resistant material at a distance from the outer end of the pipe. The clad portion may be provided by a pup piece welded to the end of the pipe. This arrangement allows two lengths of lined pipes to be joined by welding with a continuous corrosion resistant internal surface, without damage to the polymer pipe linings and in a manner which allows an assembled pipe string to be spooled onto a reel for subsequent pipelaying operations. In the preferred embodiment, the metal insert is screw-threaded to the polymer hub with an elastomeric seal therebetween, which provides a secondary seal between the end piece and the pipe wall. An alternative means of terminating a polymer lining sleeve for other purposes, such as a flange-type joint, is also disclosed.

40 Claims, 8 Drawing Sheets

FLUID PIPELINES

The present invention relates to methods and apparatus relating to fluid pipelines, particularly steel pipelines, of the type which are lined with protective sleeves, particularly sleeves of plastics material such as high density polyethylene (HDPE). The invention is particularly but not exclusively concerned with the subsea use of such lined pipelines for transporting water, hydrocarbons and other fluids.

The invention will be described with particular reference to HDPE lined pipes for water, but it should be understood that the particular materials described may be varied as necessary to meet the requirements of other fluids. Pipelines having linings of this general type will be referred to herein as "lined pipes".

It is known to line pipelines with HDPE sleeves for the purpose of protecting the interior of the pipeline against corrosion or chemical attack by the fluid being transported. However, such linings create difficulties in forming joins between lengths of pipeline. Conventional butt welding of the pipe lengths damages the lining, so that it becomes necessary for the lengths to be joined by other means, typically flange connections. In the context of subsea operations, flange connection of pipelines precludes the spooling of the pipeline onto a reel for reel-type pipelaying operations, except for pipeline stalks of limited length.

It is an object of the present invention to provide improved methods and apparatus for fabricating lined pipelines in a manner which allows arbitrary lengths of pipeline to be fabricated in a manner suitable for winding onto a reel. More particularly, it is an object of the invention to provide methods and apparatus whereby lengths of pipe lining may be sealed to the interior surfaces of pipes in such a manner that two lengths of lined pipe may be welded end to end without damage to the lining. These methods and apparatus are also applicable to the simple termination of pipe linings. It is a further object of the invention to provide another improved termination for the lining sleeve of a lined pipe which is applicable to flanged pipe terminations and to other types of pipe terminations.

In accordance with a first aspect of the invention there is provided a method of securing an end of a sleeve of lining material extending to the interior surface of a pipe, comprising the steps of providing a metallic corrosion resistant portion at the end of the pipe to which the end of the sleeve of lining material is to be secured, securing a metallic corrosion resistant end piece to the end of the lining sleeve, securing and sealing said end piece to the inner surface of the corrosion resistant portion of the pipe at a location spaced inwardly from the end thereof.

Preferably, said corrosion resistant portion of said pipe is provided by means of corrosion resistant cladding applied to the inner surface of the end of said pipe. Alternatively, said corrosion resistant portion may be provided by welding a pup piece to the end of said pipe, at least a portion of the inner surface of said pup piece being formed from corrosion resistant material.

Preferably also, said end piece each comprise a generally cylindrical plastics hub having an insert of said metallic corrosion resistant material.

Preferably, said metallic insert includes an outer cylindrical portion extending beyond the end of the hub.

Preferably also, the longitudinal end of the outer insert portion is seal welded to the corrosion resistant portion of the pipe end at a point spaced inwardly from the outermost longitudinal end thereof.

Preferably also, said insert further includes an inner cylindrical portion extending around the inner circumference of the hub.

Preferably also, said inner portion further includes a frusto-conical surface which extends outwardly over the end of the hub to mate with the inner surface of said outer portion.

Preferably also, said insert further includes radial formations extending between said outer and inner portions providing a key by means of which the insert is securely fastened to the hub.

In a preferred embodiment, said metallic insert includes a generally cylindrical portion which is secured to said plastics hub by means of a screw thread. Most preferably said cylindrical portion has an exterior screw thread which engages the inner surface of said plastics hub. The insert preferably also includes an annular shoulder extending around its exterior surface adjacent said screw thread, and the endpiece includes an elastomeric seal element located between said shoulder and the end of the plastics hub.

It is particularly preferred that the elastomeric seal element is generally rectangular in cross section, most preferably substantially square in cross section. It is further preferred that the radially inward facing surface of the seal element is concave.

In accordance with a second aspect of the invention there is provided a method of joining two lengths of lined pipe, each having a sleeve of lining material extending along the interior of the pipe, comprising the steps of securing the ends of the lining sleeves to the interior surfaces of the respective lengths of pipe by the method of the first aspect of the invention, and subsequently butt welding the ends of said pipes.

Preferably, a transition sleeve of heat resistant material is provided at the join between the pipes which bridges the gap between the ends of the respective lining sleeves.

In accordance with a third aspect of the invention there is provided a lined pipe having a sleeve of lining material extending along the interior thereof, and including a metallic corrosion resistant portion at at least one end thereof, said lining sleeve having at least one metallic corrosion resistant end piece secured to the at least end thereof adjacent to said at least one end of the pipe, said end piece being secured and sealed to the inner surface of the corrosion resistant portion of the pipe at a location spaced inwardly from the ends thereof.

Preferably, said corrosion resistant portion of said pipe comprises corrosion resistant cladding applied to the inner surface of said at least one end of said pipe. Alternatively, said corrosion resistant portion comprises a pup piece welded to said at least one end of said pipe, at least a portion of the inner surface of said pup piece being formed from corrosion resistant metallic material.

Preferably also, said end piece comprises a generally cylindrical plastics hub having an insert of said metallic corrosion resistant material.

Preferably also, said insert includes an outer cylindrical portion extending beyond the end of the hub.

Preferably also, the longitudinal end of the outer insert portion is seal welded to the corrosion resistant portion of the pipe end at a point spaced inwardly from the outermost longitudinal end thereof.

Preferably also, said insert further includes an inner cylindrical portion extending around the inner circumference of the hub.

Preferably also, said inner portion further includes a frusto-conical surface which extends outwardly over the end of the hub to mate with the inner surface of said outer portion.

Preferably also, said insert further includes radial formations extending between said outer and inner portions providing a key by means of which the insert is securely fastened to the hub.

In a preferred embodiment, said metallic insert includes a generally cylindrical portion which is secured to said plastics hub by means of a screw thread. Most preferably said cylindrical portion has an exterior screw thread which engages the inner surface of said plastics hub. The insert preferably also includes an annular shoulder extending around its exterior surface adjacent said screw thread, and the endpiece includes an elastomeric seal element located between said shoulder and the end of the plastics hub.

It is particularly preferred that the elastomeric seal element is generally rectangular in cross section, most preferably substantially square in cross section. It is further preferred that the radially inward facing surface of the seal element is concave.

In accordance with a fourth aspect of the invention, there is provided an end piece for a pipe lining sleeve as defined above in relation to the second aspect of the invention.

In accordance with a fifth aspect of the invention, there is provided a termination for a pipe lining sleeve comprising a generally cylindrical end piece attached to the end of said sleeve having at least one circumferential shoulder formed on the exterior surface thereof and adapted to engage a complementary shoulder formed around the interior bore of a pipe in which the sleeve is installed, said complementary shoulder being spaced inwardly from the outer end of said bore, a first, generally cylindrical gland member having an external annular flange adapted to engage an end face of said end piece and a second gland member adapted to threadably engage the interior of said bore and to retain said first gland member therein.

Preferably, said end piece includes first and second circumferential shoulders, and said bore includes first and second complementary shoulders.

Preferably also, said bore further includes a third shoulder adapted to limit the threadable movement of said second gland member.

Preferably also, said end piece further includes circumferential sealing means extending around its exterior surface between said first and second shoulders.

Preferably also, the inner diameter of said bore increases towards its outermost longitudinal end so as to define said first, second and third shoulders.

Preferably also, the outer diameter of the end piece is configured such that its outer diameter increases towards its end, defining said first and second shoulders thereof.

Preferably also, the inner surface of the end piece is bevelled at its outermost longitudinal end, defining a frusto-conical surface.

Preferably also, said first gland member has a bevelled outer surface at one end thereof which seats against said frusto-conical surface of the end piece.

Embodiments of the invention will now be described, by way of example only, with reference to the accompanying drawings in which FIG. 1 is a partial longitudinal sectional view of a pipe join formed between two lengths of lined pipe in accordance with the first, second, and fourth aspects of the invention;

Figure 2:
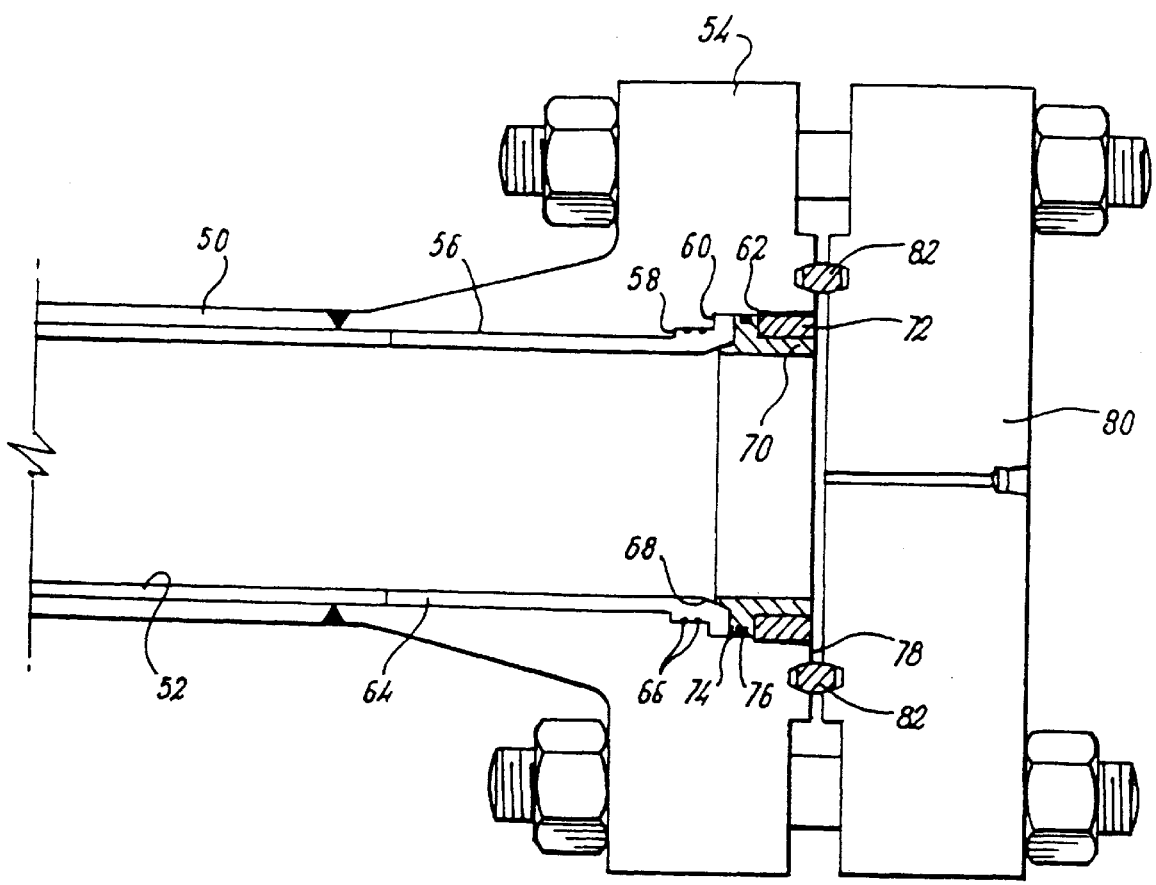
FIG. 2 is a longitudinal sectional view of a termination flange on a length of lined pipe in accordance with the fifth aspect of the invention.
Figure 4:
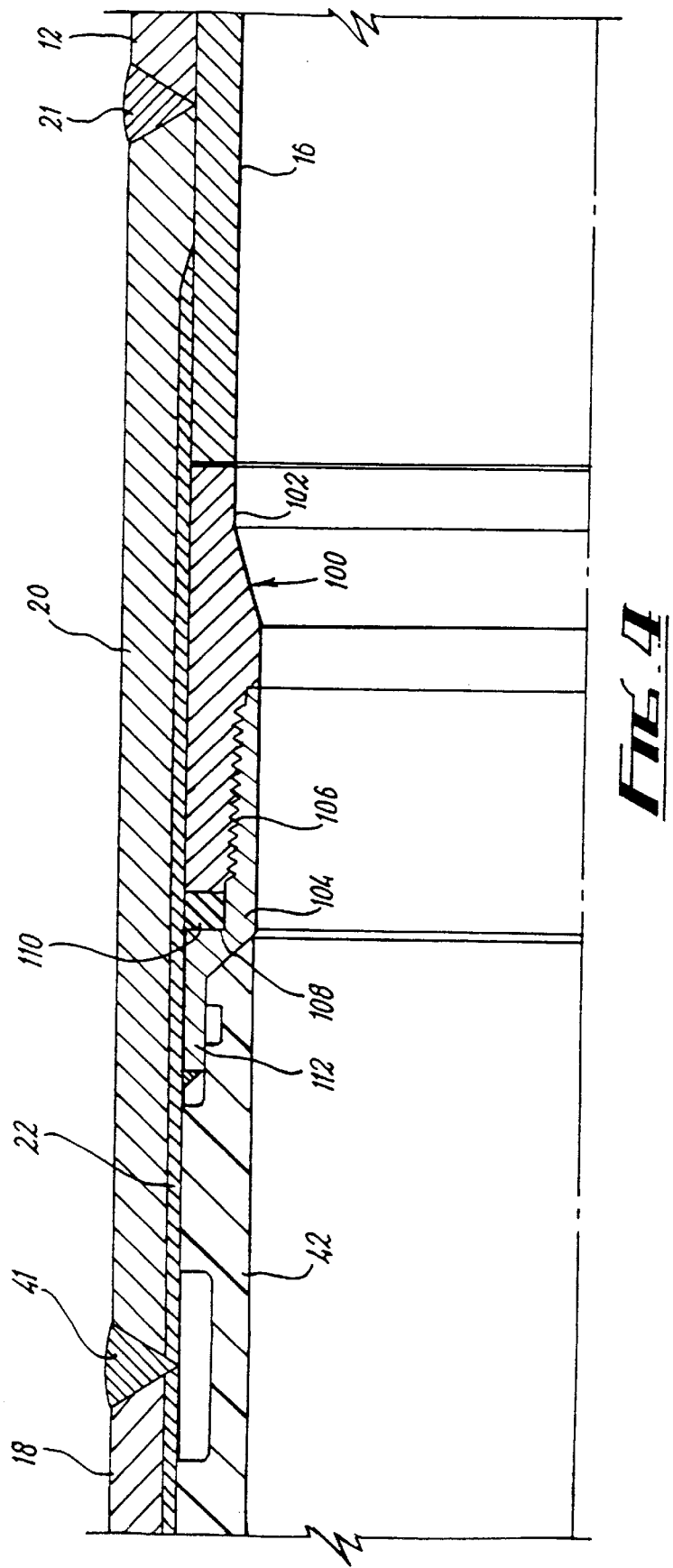
FIG. 4 is an enlarged view of part of the pipe join of FIG. 3.
Figure 8:
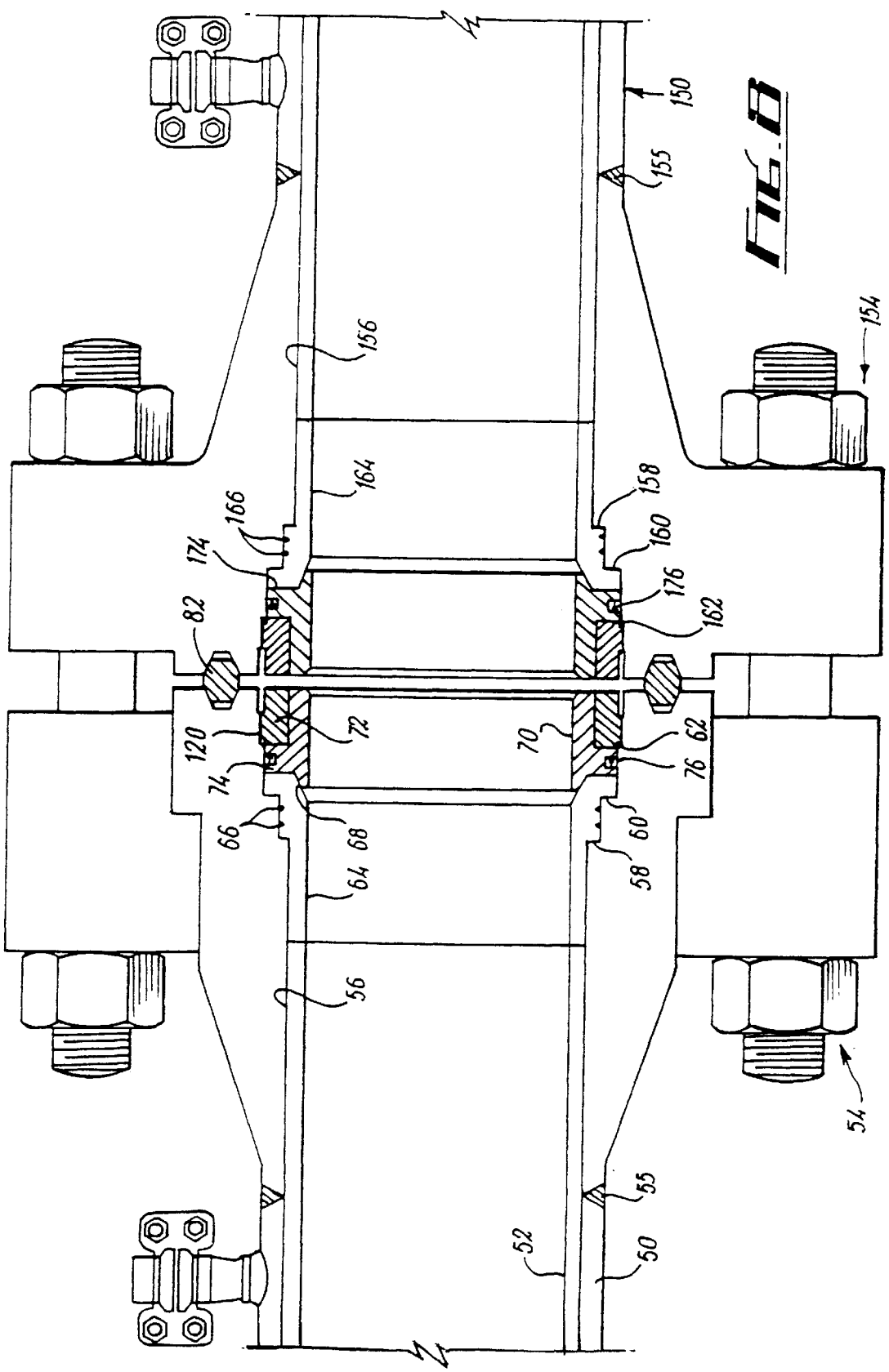

FIG. 8 is a longitudinal sectional view showing termination flanges as illustrated in FIGS. 2 and 4 being used in a flange joint between two lengths of lined pipe. fourth aspect of the invention Before describing the embodiments of the invention in detail, methods applicable to the fabrication of continuous pipeline for spooling onto a reel and to the application of lining sleeves to pipes in general will be described briefly by way of background.

Pipeline is prepared for spooling onto a reel by pre-assembling a plurality of standard pipe lengths into a number of "stalks", by conventional welding techniques. A first stalk is wound onto the reel, the second stalk is welded to the end of the first stalk and is wound onto the reel, and so on until the reel is fully loaded or the required pipeline length has been spooled. For unlined pipe, the stalks may be joined by conventional butt-welding techniques.

Lining sleeves are applied to lengths of pipeline as follows. The sleeve, which has an outside diameter substantially equal to, or perhaps slightly greater than, the inner diameter of the pipeline, is swaged down to reduce its outside diameter so that it may pass freely through the pipe. A length of sleeve matching the length of the pipe is pulled through the pipe and is stretched so that its end projects from the end of the pipe. The projecting end of the sleeve is clamped, a portion of the projecting sleeve end is cut off and an end piece is butt-welded to the cut end of the sleeve. The sleeve is then released and shrinks back to match the length of the pipe. At the same time it tends to recover its original diameter. Where the original diameter of the liner was slightly greater than the inner diameter of the pipe, a tight fit with the interior of the pipe is achieved.

In conventional lined pipe systems, the end piece might comprise a gasket arrangement for a flange type connection. The ends of the pipe are then sealed and the interior of the sleeve is pressurised so that it expands to contact the inner surface of the pipeline.

In applying known linings of this type to pre-assembled pipe stalks of the type employed in reel-type pipelaying operations, there is an upper limit on the length of stalk for which it is practical to apply the lining in the manner described above. Where flange terminations of the type normally used for lined pipes are employed, only a single stalk can be reeled since it is not possible for multiple flange-connected stalks to be wound onto the reel.

Figure 1:
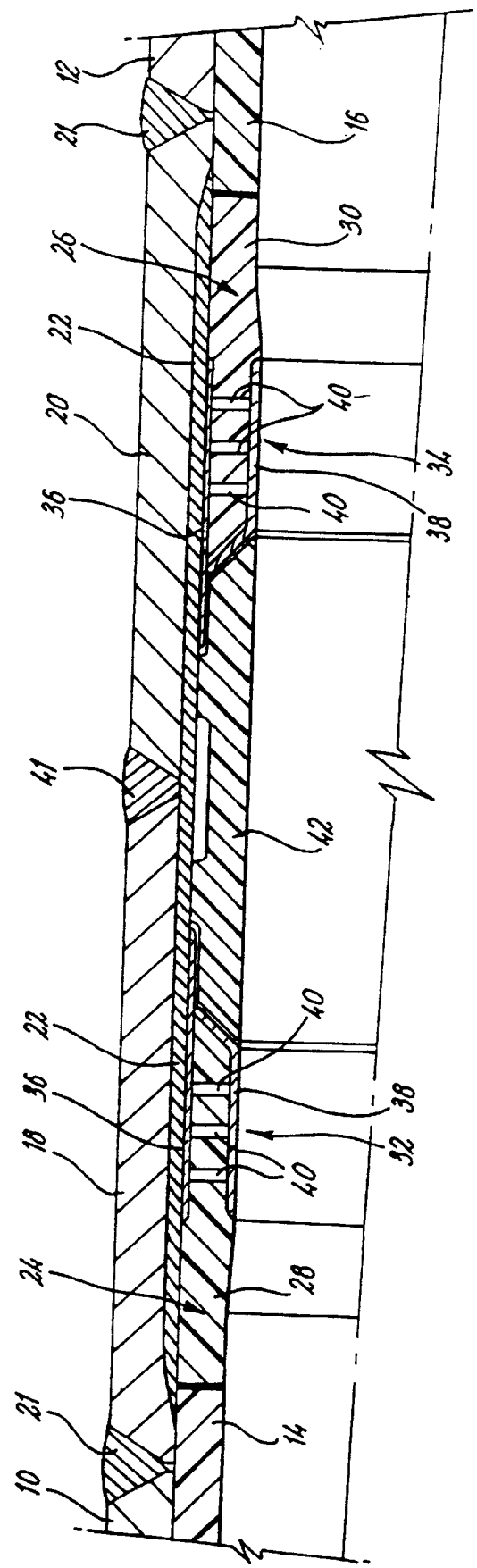

Referring now to FIG. 1 of the drawings, there is shown a pipe joint, formed between two lengths of pipe 10, 12 having HDPE lining sleeves 14, 16, which does not require flanges and which therefore allows arbitrary lengths of lined pipe to be assembled and wound onto a reel. This is achieved by securing the ends of the lining sleeves to the inner surfaces of the pipes in accordance with the first aspect of the invention.

The pipes 10, 12 are adapted for the purposes of the invention by having their ends provided with corrosion resistant inner surfaces. In the present embodiment the ends of the pipes 10, 12 comprise pup pieces 18, 20 welded to the ends of the remainder of the pipes 10, 12 the pup pieces 18, 20 having their interior surfaces clad with a suitable corrosion resistant alloy 22, such as inconel 625 or other material to suit the fluid with which the pipeline is intended to be used. Alternatively, the pup pieces might be formed entirely from corrosion resistant alloy, or the interiors of the ends of the pipe 10, 12 themselves might be clad with the alloy by other means. The pup pieces 18, 20 are welded to the pipe ends using standard commercial welds 21.

The lining sleeves 14, 16 are applied to the pipes 10, 12 in the manner described above, and are provided with end pieces 24, 26 which, in combination with the corrosion resistant portions of the pipes, form the basis for the pipe joint in accordance with the second aspect of the invention.

The end pieces 24, 26 each comprise an HDPE moulded hub 28, 30 formed with an insert 32, 34 of corrosion resistant alloy, which will normally be the same material as the alloy portion of the pipe ends. The inserts 32, 34 each comprise an outer cylindrical portion 36, which surround and extend beyond the ends of the mouldings 28, 30, and an inner cylindrical portion 38 which extend around the inner circumferences of the mouldings 28, 30. The inner portions 38 each further include a frusto-conical surface which extend outwardly over the ends of the mouldings 28, 30 to mate with the inner surfaces of the outer portions 36.

The mouldings 28, 30 are moulded into the inserts 32, 34, which further include radial formations 40 extending between the outer and inner portions 36, 38, providing a key by means of which the inserts 32, 34 are securely fastened to the mouldings 28, 30.

The outermost longitudinal ends of the outer insert portions 36 are seal welded to the alloy clad inner surfaces of the pup pieces 18, 20 at points spaced inwardly from the outermost longitudinal ends thereof. The ends of the sleeves 14, 16 are thus secured and circumferentially sealed to the inner surfaces of the pipes at a distance from the ends which are to be joined. The pipe ends can then be butt welded by a conventional weld 41 without damage to the lining sleeves 14, 16, providing a pipe join which can be reeled in the same way as conventional pipes. The sleeves 14, 16 and the alloy cladding 22 of the pup pieces 18, 20 provide a continuous corrosion resistant surface across the join. The cladding 22 could also be extended around the end surfaces of the pup pieces 18, 20, in which case the weld 41 would be an inconel weld (or other type of weld to suit the particular alloy employed).

If required, a transition sleeve 42 can be provided at the join, bridging the gap between the ends of the end pieces 28, 30 so as to maintain a substantially continuous inner surface of substantially constant diameter. The sleeve is preferably of ductile heat resistant material compatible with the relevant fluid, and should preferably be formed from a material which will not obstruct radiography of the weld 41, for example a polymer material such as PTFE. The sleeve 42 reduces the likelihood of equipment such as pigs becoming snagged at the join when passing along the interior of the pipe, and may also assist in aligning the pipe ends for welding.

Figure 3:
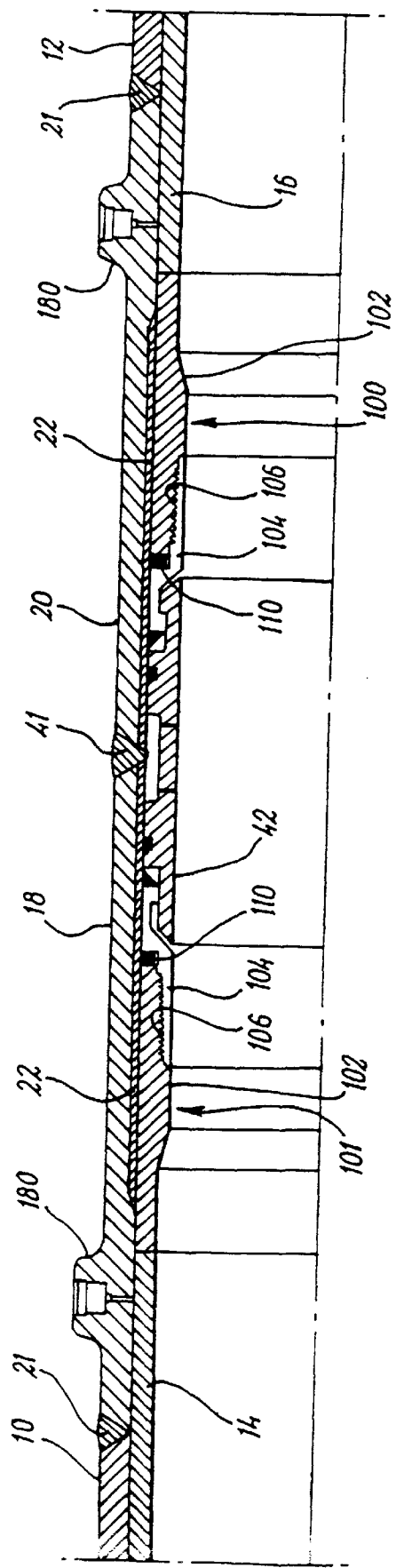
FIG. 3 is a partial longitudinal sectional view of a preferred embodiment of part of a pipe join formed between two lengths of lined pipe in accordance with the first, second and third aspects of the invention.
Figure 5:
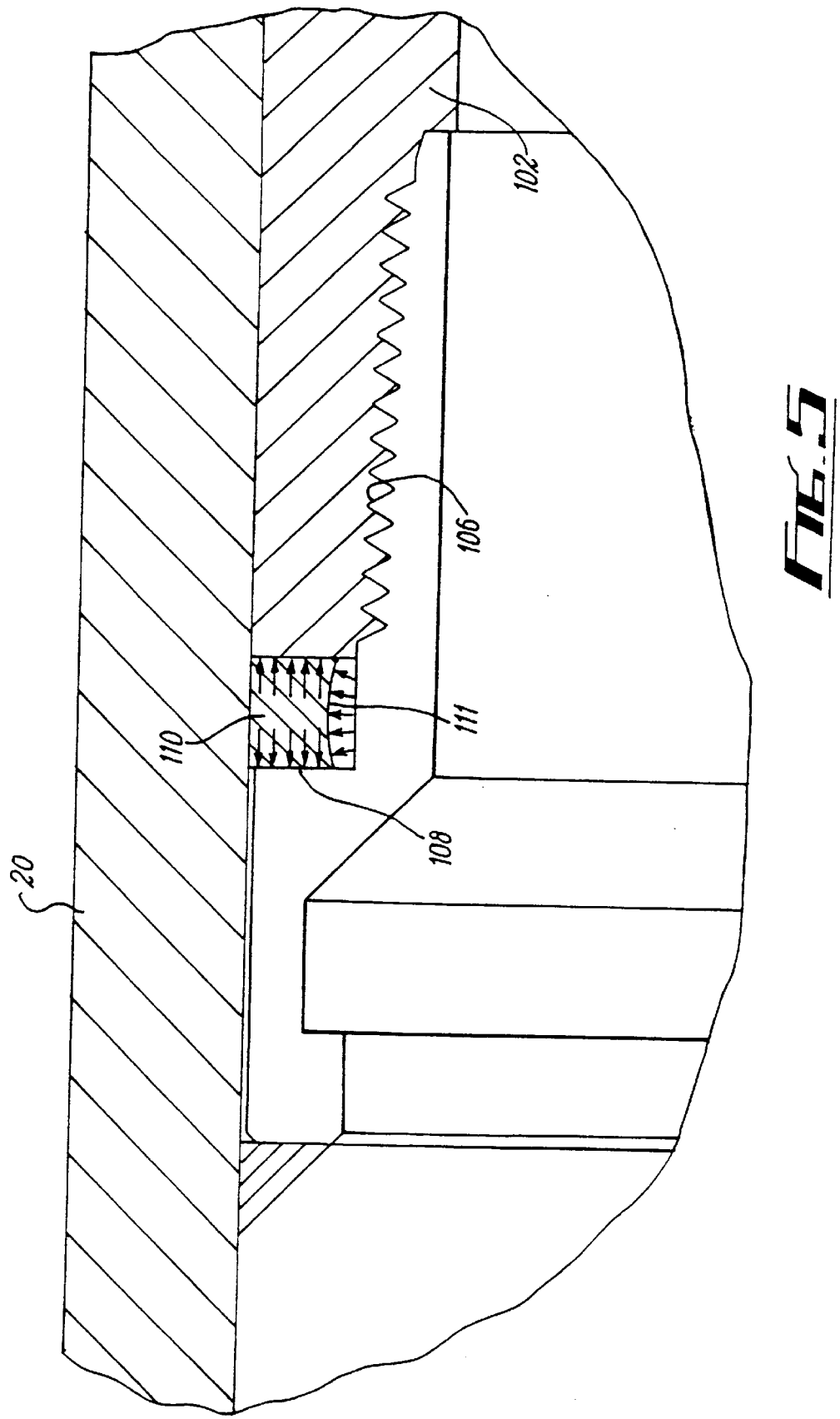
FIG. 5 is a further enlarged view of part of the pipe join of FIGS. 3 and 4.

FIGS. 3 to 5 show a preferred embodiment of a pipe join similar to that of FIG. 1, and parts of the assembly common to FIG. 1 are designated by like reference numerals; ie the pipes 10,12, liners 14,16, pup pieces 18, 20, welds 21, 41, cladding 22 and transition sleeve 42.

The arrangement differs from FIG. 1 in the configuration of the end pieces 100, 101, which again each comprises an HDPE hub 102 and a corrosion resistant metallic insert 104. In this case the insert 104 has an externally screw-threaded portion 106 which is screwed into the hub 102, engaging its inner surface. The thread 106 is preferably tapered as shown, and may suitably comprise a dry seal National Pipe Taper Thread, having an interference fit (suitably 0.25 mm) so as to create a seal at the thread interface. It can be seen that the wall of the polymer hub 102 is thickened at its threaded portion so that the strength of the hub and of its connection to the metal insert 104 can be made to be at least as strong as the liners 14, 16 themselves.

The insert also has an external annular shoulder 108 adjacent the threaded portion 106, and a circular elastomeric seal element 110 is located between the shoulder 108 and the end of the hub 102. The seal element 110 preferably has a rectangular or square cross section, best seen in FIGS. 4 and 5. Most preferably, the radially inwards facing surface 111 is concave in cross section (FIG. 5). This seal is important for preventing any leakage of fluids through the thread 106. It is relatively easy to make a good plastic-to-metal seal, but long term plastic creep, exacerbated by high temperatures, may result in failure of the seal. It has been found that the use of a square section seal of elastomeric material is highly effective in preventing such leakage by establishing maintaining a seal regardless of variations in component tolerances and subsequent deformation as might be caused by spooling, laying and use of the pipeline.

The use of the threaded insert 104 and the seal 110 requires the insert to be threaded into the polymer hub 102 whilst the latter is in situ in the pipe. The hub 102 and sleeve 16 may be held in place by a hydraulic clamp or the like inserted into the bore thereof to hold the hub 102 stationary while the insert is screwed in. The outer end of the insert may be configured in any suitable manner to be engaged by a complementary tool for this purpose. The seal element 110 deforms as the insert 104 is screwed into the hub 102. This deformation establishes a seal between the side faces of the seal 110 and the adjacent surfaces of the hub 102 and insert 104, this seal being enhanced by increased deformation. The concave surface 111 tends to deform outwardly so that the cross sectional shape becomes closer to square. Also, any fluid pressure arising from leakage through the thread tends to enhance the seal.

The seal material should be resistant to high temperatures arising from the seal welding of the insert 104, and also in use. Viton is an example of a suitable material.

The insert 104 further includes an outer cylindrical portion 112 which is seal welded to the cladding 22 on the interior of the pup piece 20 as before. In this case the hub 102 is preferably machined rather than moulded. That portion of the hub 102 which receives the screw thread 106 is thicker than the lining 16.

FIG. 3 also shows first and second vent ports provided in the pup pieces 18, 20, which communicate with the annulus between the inner surface of the pipes and the outer surfaces of the sleeves. These ports allow gas to vent from the annulus and may also be used for test purposes. The ports may be located such that they do not interfere with the spooling of the assembled pipe onto a reel. The embodiment of FIG. 1 may also include similar ports.

The embodiment of FIGS. 3, 4 and 5 is simpler to manufacture and provides better performance than that of FIG. 1. In particular, it provides a secondary seal in addition to the main seal weld.

Figure 6:
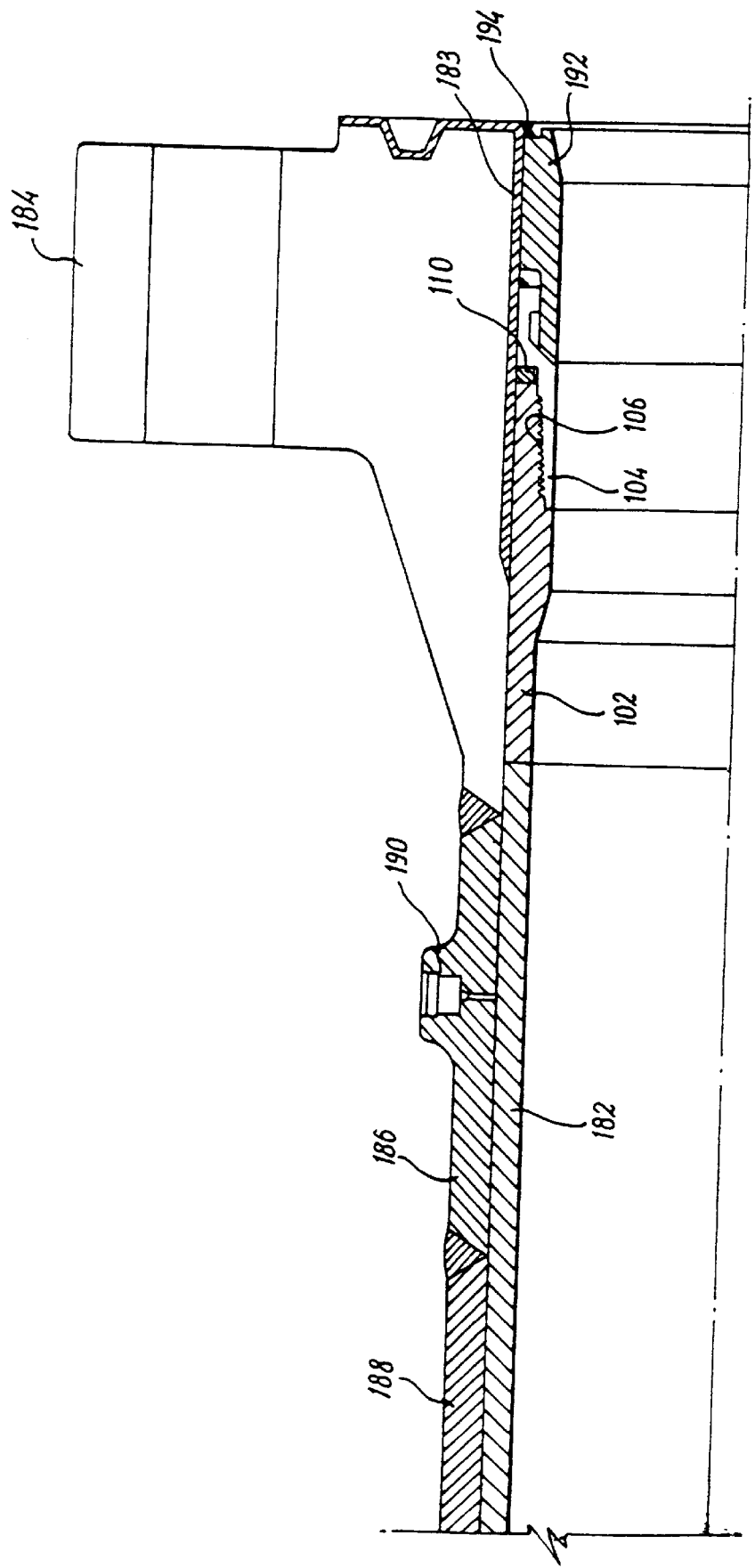
FIG. 6 is a longitudinal sectional view of a termination flange on a length of lined pipe formed in accordance with the first aspect of the invention.

The methods and apparatus for securing the lining sleeves to the pipes as described above in relation to FIGS. 1, 3, 4 and 5 may also be applied for simply terminating a pipe lining at the end of a pipe. An example of this is shown in FIG. 6. It can be seen that the sleeve 182 is secured to a corrosion resistant, alloy-clad surface 183 of the inner bore of an end flange 184, at a distance from the outer end thereof, using a polymer hub 102, metal insert 104 and seal 110 as in FIGS. 3, 4 and 5. In this case a carbon steel pup piece 186 is welded between the flange piece 184 and the pipe 188, and includes a vent port 190 similar to those of FIGS. 3, 4 and 5. If required, a corrosion resistant transition piece 192 may be inserted into the end of the flange piece 184, and welded to the end of the bore thereof at 194. In this case the transition piece may be formed of suitable metal or alloy, since it will not interfere with radiography of any pipe welds.

The methods and apparatus for securing lining sleeves to the interior surfaces of pipes as hereinbefore described with reference to FIGS. 1, 3, 4, 5 and 6 have a number of advantages, particularly in relation to the joining of lined pipe sections. The spacing of the metal inserts from the ends of the pipes provides a position at which the pipe may be cut; eg. for the abandonment of the pipe during pipelay operations or to allow replacement of damaged lengths of pipe. Reconnection of the cut pipe ends may be carried out using flange connections welded to the ends of the pipe, since the new join will not have to be spoolable. This spacing also prevents thermal damage to the lining during welding. The cladding of the pup pieces or the pipe itself may extend a sufficient distance inwards beyond the welded insert that the end can be cut back and the seal remade in the event that there is a fault in the sealing of the lining sleeve to the pipe. The method also fixes the liner to the pipe wall at regular intervals, thereby restraining axial expansion of the liner.

In all of the cases described above, it is preferable that the polymer hub has a tensile strength equal to or greater than that of the lining sleeves, and should preferably be manufactured from the same generic polymer having the same meltflow index as the sleeves to ensure good butt fusion characteristics. The clad pup pieces should preferably be formed from carbon steel with the same yield strength and work hardening rate as the pipes to ensure good spooling characteristics. The extent of the corrosion resistant weld cladding should preferably be sufficient to allow at least one re-termination of the joint, should this be required, and the internal metal components should preferably be made as short as possible to minimise any impact which they may have on the bending characteristics of the assembled pipe.

Figure 7:
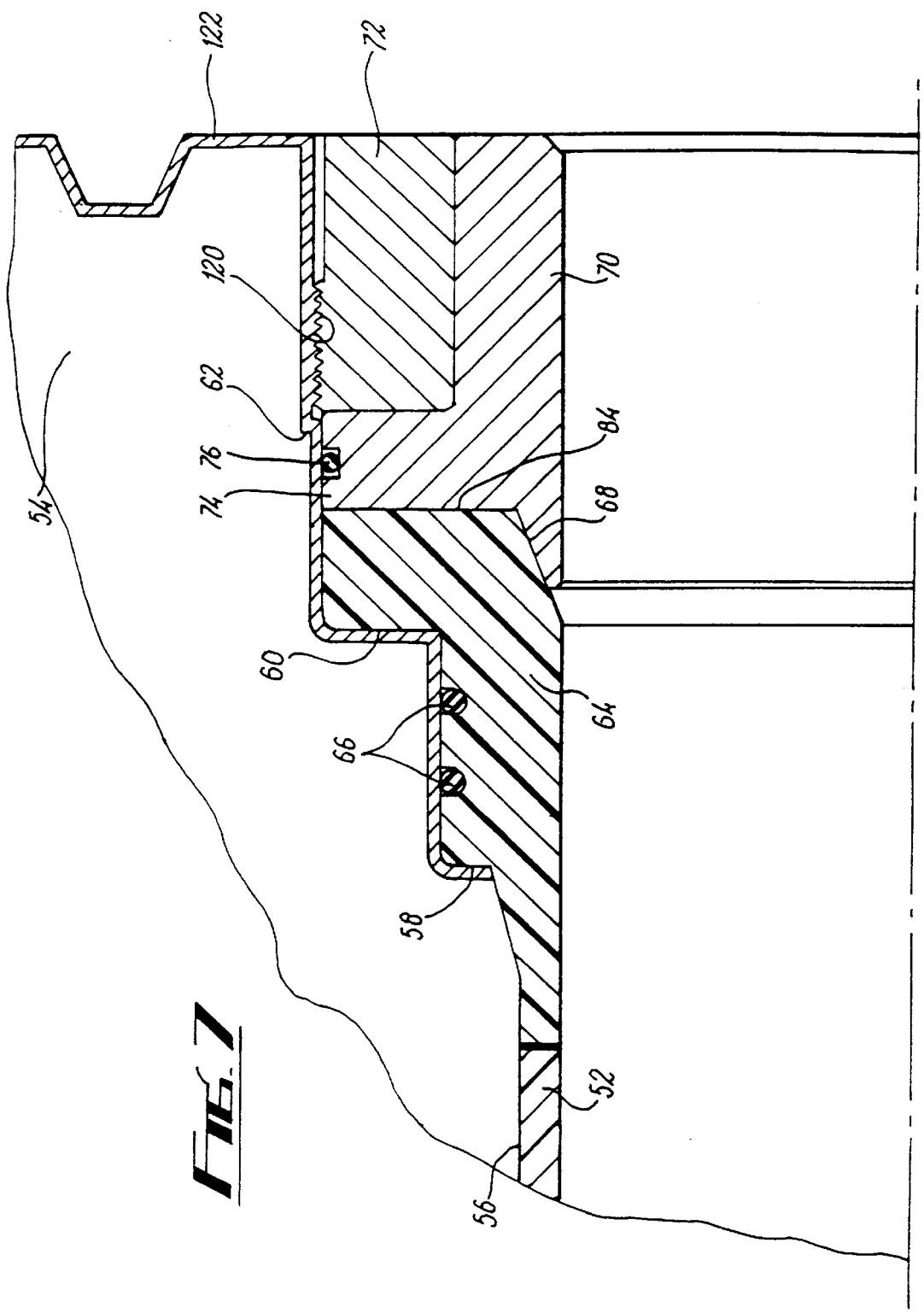
FIG. 7 is an enlarged sectional view of the termination flange of FIG. 2.

Turning now to FIGS. 2, and 7, there is shown an embodiment of an improved termination for a lined pipe in accordance with the fourth aspect of the invention, in this case a flange type termination. The lining termination provides a seal between the end of the lining sleeve and the interior of the pipe, and may also be used with pipe terminations other than flanges.

In FIGS. 2 and 7, a pipe 50 having a lining sleeve 52 has an end flange 54 attached to its end by a weld 55. The flange 54 has a bore 56 of inner diameter equal to that of the pipe 50, said diameter being increased towards its outermost longitudinal end so as to define first, second and third circumferential shoulders 58, 60, 62. The lining sleeve 52 is applied to the pipe 50 in the same manner as previously described, and has an end piece 64, preferably of machined HDPE, butt welded to the end thereof.

In this case, the end piece 64 is configured such that its outer diameter increases towards its end, defining fourth and fifth circumferential shoulders complementary to the first and second shoulders 58, 60 of the flange 54, and is provided with a pair of O-rings 66 on its exterior surface between said fourth and fifth shoulders, which seal, in use, against the corresponding inner surface of the flange bore 56. The inner surface of the end piece 64 is bevelled at its outermost longitudinal end, defining a frusto-conical surface 68.

The end piece 64 is retained by means of first and second gland members 70, 72. The first gland member is generally cylindrical, having an external, annular flange 74 which seats against the end of the end piece 64, and having a bevelled outer surface at one end thereof which seats against the frusto-conical surface 68. of the end piece 64. The angle of the bevelled surface is preferably slightly different from that of the frusto-conical surface 68 of the end piece 64. The other end of the first gland member 70 is substantially flush with the end of the flange bore 56. The first gland member further includes a sealing member 76 (which may be an O-ring but is preferably of a more sophisticated proprietary type of sealing element, such as are well known in the art) which extends around the surface of the annular flange and seals against the flange bore 56.

In preferred embodiments of the invention, the faces of the shoulders 58 and 60 and that surface 84 of the flange 74 which abuts the end piece 64 are formed with concentric circular serrations (not shown), of a type which are well known in the art in relation to flange faces. These serrations engage the adjacent surfaces of the end piece 64 to enhance the seal therebetween.

The second gland member 72 is generally cylindrical, having an externally threaded surface 120 (FIG. 4) which engages a thread formed in the flange bore 56 between the third shoulder 62 and the outermost end thereof. The third shoulder 62 may limit the inward movement of the second gland member 72, so that the first gland member 70 may be loosely retained, rather than being compressively clamped by the second gland member 72.

In preferred embodiments of the invention, the first gland member 70 is inserted into the end of the end piece 64 and a compressive force is applied thereto by means of a hydraulic jack or the like to force the first gland member 70 against the end piece 64 and to force the end piece 64 against the shoulders 58, 60. The second gland member 72 is fitted prior to the compressive force being removed.

The compressive force may be re-applied and the second gland member 72 further tightened one or more times to maximise the seal between the various mating faces of the first gland member 70, the end piece 64 and the pipe flange 54, and to ensure that the serrations on the various serrated faces are fully "dug-in" to the end piece 64.

The arrangement of the flange bore 56, end piece 64 and first and second gland members 70, 72 thus seals the end of the sleeve 52 to the interior of the bore 56. If required, corrosion resistant cladding 122 (FIG. 4) may be provided on the flange surface 78 and the interior surface of the bore 56, at least to a point inwards of the O-rings 66. The flange 54 can then be coupled to another component, such as a blind test flange 80, using any suitable flange sealing arrangement such as an O-ring 82 between the mating faces. The termination may also be used in the flange connection of two lengths of pipe 50, 150 as shown in FIG. 8, each having a lining terminated in the same manner. Those parts associated with the first pipe 50 are given the same reference numerals as in FIGS. 2 and 4, whilst those associated with the second pipe 150 are given the same reference numerals as the first pipe, prefixed "1".

The lining sleeve termination arrangement as described above includes multiple sealing mechanisms to provide a highly effective and reliable seal between the liner and the interior of the pipe, namely: the mating (preferably serrated) surfaces of the shoulders 58, 60 and of the gland surface 84 with the end piece 64; the mating frusto-conical surfaces of the end piece 64 and the gland member 70; and the seal elements 66 and 76. The termination might may also be applied to pipe terminations other than flange terminations.

Improvements and modifications may be incorporated without departing from the scope of the invention.

I claim:

1. A method of securing an end of a sleeve of plastic lining material to the interior surface of a metallic pipe, comprising the steps of:
   providing a metallic corrosion resistant portion at an end of the pipe to which the end of the sleeve of plastic lining material is to be secured,
   securing a metallic corrosion resistant end piece to the end of the sleeve of plastic lining material, and
   securing and sealing said metallic corrosion resistant end piece to an inner surface of the corrosion resistant portion of the pipe at a location spaced inwardly from the end of the pipe.

2. A method as claimed in claim 1, wherein said corrosion resistant portion of said pipe is provided by means of corrosion resistant cladding applied to the inner surface of the end of said pipe.

3. A method as claimed in claim 1, wherein said end of said pipe comprises a pup piece welded to an end of the remainder of said pipe, at least a portion of the inner surface of said pup piece being formed from corrosion resistant material, thereby forming said corrosion resistant portion of said pipe.

4. A method as claimed in claim 1, wherein said end piece comprises a generally cylindrical plastics hub having an insert of said metallic corrosion resistant material.

5. A method as claimed in claim 4, wherein said metallic insert includes an outer cylindrical portion extending beyond the end of the hub.

6. A method as claimed in claim 5, wherein a longitudinal end of the outer cylindrical portion of the metallic insert is seal welded to the corrosion resistant portion of the pipe end at a point spaced inwardly from an outermost longitudinal end thereof.

7. A method as claimed in claim 5, wherein said insert further includes an inner cylindrical portion extending around the inner circumference of the hub.

8. A method as claimed in claim 7, wherein said inner portion further includes a frusto-conical surface which extends outwardly over the end of the hub to mate with the inner surface of said outer portion.

9. A method as claimed in claim 7, wherein said insert further includes radial formations extending between said outer and inner portions providing a key by means of which the insert is securely fastened to the hub.

10. A method as claimed in claim 4, wherein said metallic insert includes a generally cylindrical portion which is secured to said plastics hub my means of a screw thread.

11. A method as claimed in claim 10, wherein said cylindrical portion has an exterior screw thread which engages the inner surface of said plastics hub.

12. A method as claimed in claim 11, wherein the insert also includes an annular shoulder extending around its exterior surface adjacent said screw thread, and the endpiece includes an elastomeric seal element located between said shoulder and the end of the plastics hub.

13. A method as claimed in claim 12, wherein said elastomeric seal element is generally rectangular in cross section.

14. A method as claimed in claim 13, wherein said elastomeric seal element is substantially square in cross section.

15. A method as claimed in claim 13, wherein the radially inward facing surface of the seal element is concave in cross section.

16. A method of joining two lengths of lined pipe, each having a sleeve of lining material extending along the interior of the pipe, comprising the steps of securing the ends of the lining sleeves to the interior surfaces of the respective lengths of pipe by the method of claim 1, and subsequently butt welding the ends of said pipes.

17. A method as claimed in claim 16, wherein a transition sleeve of heat resistant material is provided at the joint between the pipes which bridges a gap between the ends of the respective lining sleeves.

18. A plastic-lined metallic pipe having a sleeve of plastic lining material extending along the interior thereof, and including a metallic corrosion resistant portion at at least one end thereof, said lining sleeve having at least one metallic corrosion resistant end piece secured to at least an end thereof adjacent to said at least one end of the pipe, said end piece being secured and sealed to an inner surface of the corrosion resistant portion of the pipe at a location spaced inwardly from said at least one end of the pipe.

19. A plastic-lined metallic pipe as claimed in claim 18, wherein said corrosion resistant portion of said pipe comprises corrosion resistant cladding applied to the inner surface of said at least one end of said pipe.

20. A plastic-lined metallic pipe as claimed in claim 18, wherein said corrosion resistant portion comprises a pup piece welded to said at least one end of said pipe, at least a portion of the inner surface of said pup piece being formed from corrosion resistant metallic material.

21. A plastic-lined metallic pipe as claimed in claim 18, wherein said end piece comprises a generally cylindrical plastics hub having an insert of said metallic corrosion resistant material.

22. A plastic-lined metallic pipe as claimed in claim 21, wherein said insert includes an outer cylindrical portion extending beyond the end of the hub.

23. A plastic-lined metallic pipe as claimed in claim 22, wherein the longitudinal end of the outer insert portion is seal welded to the corrosion resistant portion of the pipe end at a point spaced inwardly from the outermost longitudinal end thereof.

24. A plastic-lined metallic pipe as claimed in claim 22, wherein said insert further includes an inner cylindrical portion extending around the inner circumference of the hub.

25. A plastic-lined metallic pipe as claimed in claim 24, wherein said inner portion further includes a frusto-conical surface which extends outwardly over the end of the hub to mate with the inner surface of said outer portion.

26. A plastic-lined metallic pipe as claimed in claim 25, wherein said insert further includes radial formations extending between said outer and inner portions providing a key by means of which the insert is securely fastened to the hub.

27. A plastic-lined metallic pipe as claimed in claim 21, wherein said metallic insert includes a generally cylindrical portion which is secured to said plastics hub by means of a screw thread.

28. A plastic-lined metallic pipe as claimed in claim 27, wherein said cylindrical portion has an exterior screw thread which engages the inner surface of said plastics hub.

29. A plastic-lined metallic pipe as claimed in claim 28, wherein the insert also includes an annular shoulder extending around its exterior surface adjacent said screw thread, and the endpiece includes an elastomeric seal element located between said shoulder and the end of the plastics hub.

30. A plastic-lined metallic pipe as claimed in claim 29, wherein said elastomeric seal element is generally rectangular in cross section.

31. A plastic-lined metallic pipe as claimed in claim 30, wherein said elastomeric seal element is substantially square in cross section.

32. A plastic-lined metallic pipe as claimed in claim 30, wherein the radially inward facing surface of the seal element is concave in cross section.

33. A termination for a pipe lining sleeve installed in an interior bore of a pipe, said termination comprising a generally cylindrical end piece attached to the end of said sleeve in combination with a pipe having an interior bore adapted to cooperate with said end piece, said end piece having at least one circumferential shoulder formed on the exterior surface thereof and adapted to engage a complementary shoulder formed around the interior bore of said pipe, said complementary shoulder being spaced inwardly from an outer end of said bore, the termination further including a first, generally cylindrical gland member having an external annular flange adapted to engage an end face of said end piece and a second gland member adapted to threadably engage the interior of said bore and to retain said first gland member therein.

34. A termination for a pipe lining sleeve as claimed in claim 33, wherein said end piece includes first and second circumferential shoulders, and said bore includes first and second complementary shoulders.

35. A termination for a pipe lining sleeve as claimed in claim 34, wherein said bore further includes a third shoulder adapted to limit the threadable movement of said second gland member.

36. A termination for a pipe lining as claimed in claim 34, wherein said end piece further includes circumferential sealing means extending around its exterior surface between said first and second shoulders.

37. A termination for a pipe lining as claimed in claim 35, wherein the inner diameter of said bore increases towards its outermost longitudinal end so as to define said first, second and third shoulders.

38. A termination for a pipe lining as claimed in claim 34, wherein the outer diameter of the end piece is configured such that its outer diameter increases towards its end, defining said first and second shoulders thereof.

39. A termination for a pipe lining as claimed in claim 33, wherein the inner surface of the end piece is bevelled at its outermost longitudinal end, defining a frusto-conical surface.

40. A termination for a pipe lining as claimed in claim 39, wherein said first gland member has a bevelled outer surface at one end thereof which seats against said frusto-conical surface of the end piece.

\* \* \* \* \*